US010334097B2

(12) United States Patent
Wang et al.

(10) Patent No.: US 10,334,097 B2
(45) Date of Patent: Jun. 25, 2019

(54) METHOD AND APPARATUS FOR DISABLING ALARM IN DEVICE, AND STORAGE MEDIUM

(71) Applicant: Beijing Xiaomi Mobile Software Co., Ltd., Haidian District, Beijing (CN)

(72) Inventors: Wenyan Wang, Beijing (CN); Zhenhai Zhao, Beijing (CN); Xiehao Bao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 43 days.

(21) Appl. No.: 15/590,013

(22) Filed: May 9, 2017

(65) Prior Publication Data

US 2018/0227411 A1 Aug. 9, 2018

(30) Foreign Application Priority Data

Sep. 29, 2016 (CN) .......................... 2016 1 0866960

(51) Int. Cl.
*G06F 3/16* (2006.01)
*H04M 1/725* (2006.01)
(Continued)

(52) U.S. Cl.
CPC ........ *H04M 1/72577* (2013.01); *G06F 3/167* (2013.01); *H04M 1/72566* (2013.01);
(Continued)

(58) Field of Classification Search
CPC ......... H04M 1/72577; H04M 1/72572; H04M 19/045; H04M 1/72566; H04M 1/72569;
(Continued)

(56) References Cited

U.S. PATENT DOCUMENTS 8,271,287 B1 * 9/2012 Kermani .......... H04N 21/42203
704/275
2001/0031651 A1 * 10/2001 Nakae ............... H04M 1/72566
455/572
(Continued)

FOREIGN PATENT DOCUMENTS

CN 1921654 A 2/2007
CN 102821207 A 12/2012
(Continued)

OTHER PUBLICATIONS

Extended European search report of European Patent Application No. 17156742.3, from the European Patent office, dated Sep. 20, 2017.
(Continued)

*Primary Examiner* — Charles N Appiah
*Assistant Examiner* — Margaret G Mastrodonato
(74) *Attorney, Agent, or Firm* — Jun He Law Offices P.C.; James J. Zhu

(57) ABSTRACT

A method and apparatus for disabling an alarm in a device, and a storage medium are provided. The method includes: when a powering-off event for the device is detected, determining whether a condition for disabling a preset alarm in the device is satisfied; and when the condition for disabling the preset alarm in the device is satisfied, disabling the preset alarm in the device to prevent the preset alarm from being activated when the device is in a powered-off state.

14 Claims, 9 Drawing Sheets

(51) Int. Cl.
*H04M 19/04* (2006.01)
*H04W 48/04* (2009.01)

(52) U.S. Cl.
CPC ... *H04M 1/72569* (2013.01); *H04M 1/72572* (2013.01); *H04M 19/045* (2013.01); *H04W 48/04* (2013.01)

(58) Field of Classification Search
CPC .. H04M 19/72569; H04W 48/04; H04W 4/02
See application file for complete search history.

(56) References Cited

U.S. PATENT DOCUMENTS

| | | | | |
|---|---|---|---|---|
| 2003/0017821 | A1* | 1/2003 | Irvin | H04W 4/02 455/410 |
| 2005/0170849 | A1 | 8/2005 | McClelland | |
| 2008/0258913 | A1* | 10/2008 | Busey | G08B 21/0415 340/540 |
| 2013/0250734 | A1* | 9/2013 | Narasani | G04G 13/02 368/9 |
| 2013/0252591 | A1* | 9/2013 | Sasaki | H04W 4/00 455/414.1 |
| 2017/0163782 | A1* | 6/2017 | Agrawal | H04M 1/274533 |

FOREIGN PATENT DOCUMENTS

| | | |
|---|---|---|
| CN | 102970417 A | 3/2013 |
| CN | 103002153 A | 3/2013 |
| CN | 103297588 A | 9/2013 |
| CN | 103945055 A | 7/2014 |
| WO | 2006019378 A1 | 2/2006 |
| WO | 2013184530 A1 | 12/2013 |

OTHER PUBLICATIONS

Huawei, "Huawei IDEOS X3 Model: Huawei U8510-1", published on Dec. 31, 2011, XP055398486, Retrieved from the Internet: URL:http://www.lidl.de/de/asset/other/HUAWEI_Smartphone_-X3_Handbuch.pdf (retrived on Aug. 14, 2017), pp. 1, 62 and 72.
First Office Action issued in corresponding Chinese Application No. 201610866960.5 dated Dec. 29, 2018.

* cited by examiner

METHOD AND APPARATUS FOR DISABLING ALARM IN DEVICE, AND STORAGE MEDIUM

CROSS-REFERENCE TO RELATED APPLICATIONS

This application is based on and claims the priority of the Chinese patent application No. 201610866960.5, filed on Sep. 29, 2016, which is incorporated herein by reference in its entirety.

TECHNICAL FIELD

The present disclosure is related to the technical field of devices, and more particularly to a method and apparatus for disabling an alarm in a device, and a storage medium.

BACKGROUND

With the development of science and technology, more and more people prefers to travel by air. However, traveling by air brings many security risks, while saving time and improving efficiency for passengers.

Typically, when traveling by air, passengers will be required to power off electronic devices such as mobile phones. A mobile phone is not allowed to be used on a plane, because radio waves emitted by the mobile phone may interfere with air-ground communications and affect flight safety.

Currently, many mobile phones have the function of power-off alarm. With an alarm preset in a mobile phone, it can power on the mobile phone at a preset time and ring even if the mobile phone is in a powered-off state. As such, important alerting alarms can be prevented from being missed in case the mobile phone has been powered off by a user. However, if the user is travelling by air, the activation of the power-off alarm will power on the mobile phone, thus, bringing security risks.

SUMMARY

The present disclosure provides a method for disabling an alarm in a device, and a storage medium.

According to a first aspect of the disclosure, there is provided a method for disabling an alarm in a device. The method includes: when a powering-off event for the device is detected, determining whether a condition for disabling a preset alarm in the device is satisfied; and when the condition for disabling the preset alarm in the device is satisfied, disabling the preset alarm in the device to prevent the preset alarm from being activated when the device is in a powered-off state.

According to a second aspect of the disclosure, there is provided an apparatus for disabling an alarm in a device, the apparatus comprising: a processor; and a memory storing instructions executable by the processor, wherein the processor is configured to: when a powering-off event for the device is detected, determine whether a condition for disabling a preset alarm in the device is satisfied; and when the condition for disabling the preset alarm in the device is satisfied, disable the preset alarm in the device to prevent the preset alarm from being activated when the device is in a powered-off state.

According to a third aspect of the disclosure, there is provided a non-transitory computer-readable storage medium having stored therein instructions that, when executed by a processor of a mobile terminal, causes the mobile terminal to perform a method for disabling an alarm in a device, the method comprising: when a powering-off event for the device is detected, determining whether a condition for disabling a preset alarm in the device is satisfied; and when the condition for disabling the preset alarm in the device is satisfied, disabling the preset alarm in the device to prevent the preset alarm from being activated when the device is in a powered-off state.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise indicated. The implementations set forth in the following description of embodiments do not represent all implementations consistent with the disclosure. Instead, they are merely examples of apparatuses and methods consistent with aspects related to the disclosure as recited in the appended claims.

Figure 1:
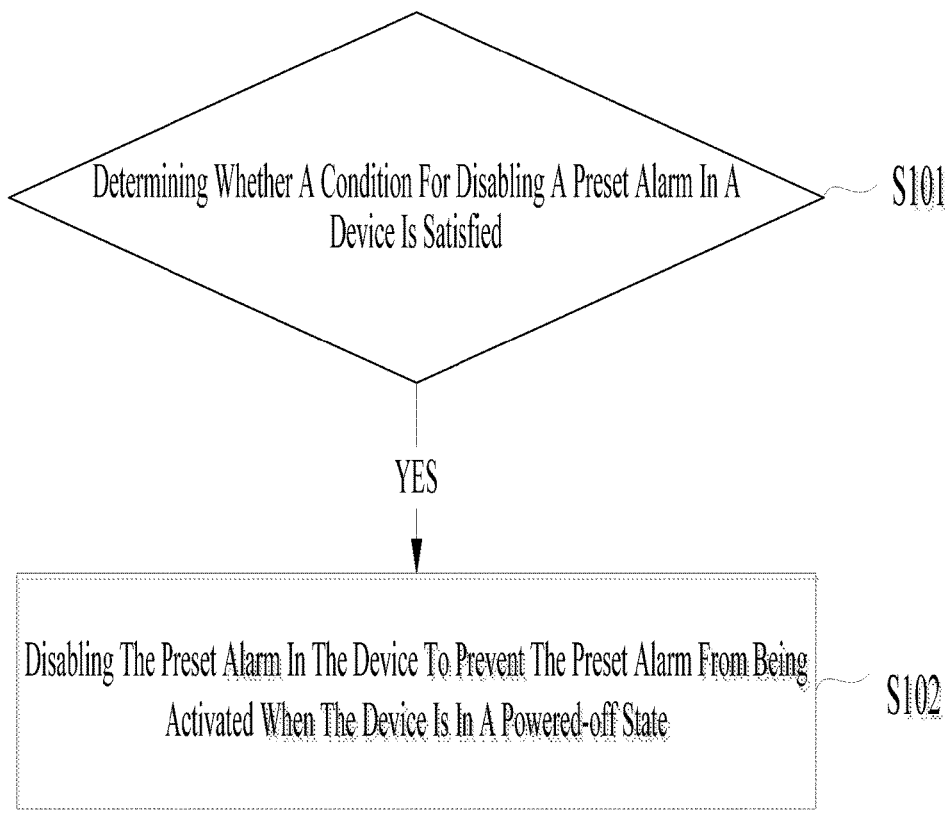
FIG. 1 is a flowchart of a method for disabling an alarm in a device according to an exemplary embodiment.

FIG. 1 is a flowchart of a method for disabling an alarm in a device according to an exemplary embodiment. As shown in FIG. 1, the method for disabling the alarm in the device is implemented in a terminal and may comprise the following steps.

In step S101, when a powering-off event for the device is detected, it is determined whether a condition for disabling a preset alarm in the device is satisfied.

In step S102, when the condition for disabling the preset alarm in the device is satisfied, the preset alarm in the device is disabled to prevent the preset alarm from being work when the device is in a powered-off state.

It is to be noted that detecting a powering-off event for the device may be detecting a powering-off event triggered by a user by pressing a predetermined physical button or a virtual button on a human-machine interaction interface.

With the embodiment, when a powering-off event for a device is detected, it can be determined whether a condition for disabling a preset alarm in the device is satisfied, thereby disabling the preset alarm in the device timely as required. As such, a power-off alarm in the device can be blocked from working, thereby reducing impacts on surrounding environments of the device caused by working of the power-off alarm. For example, when a user is on aboard or near a plane, a power-off alarm is timely blocked from working, thereby reducing security risks.

Figure 2:
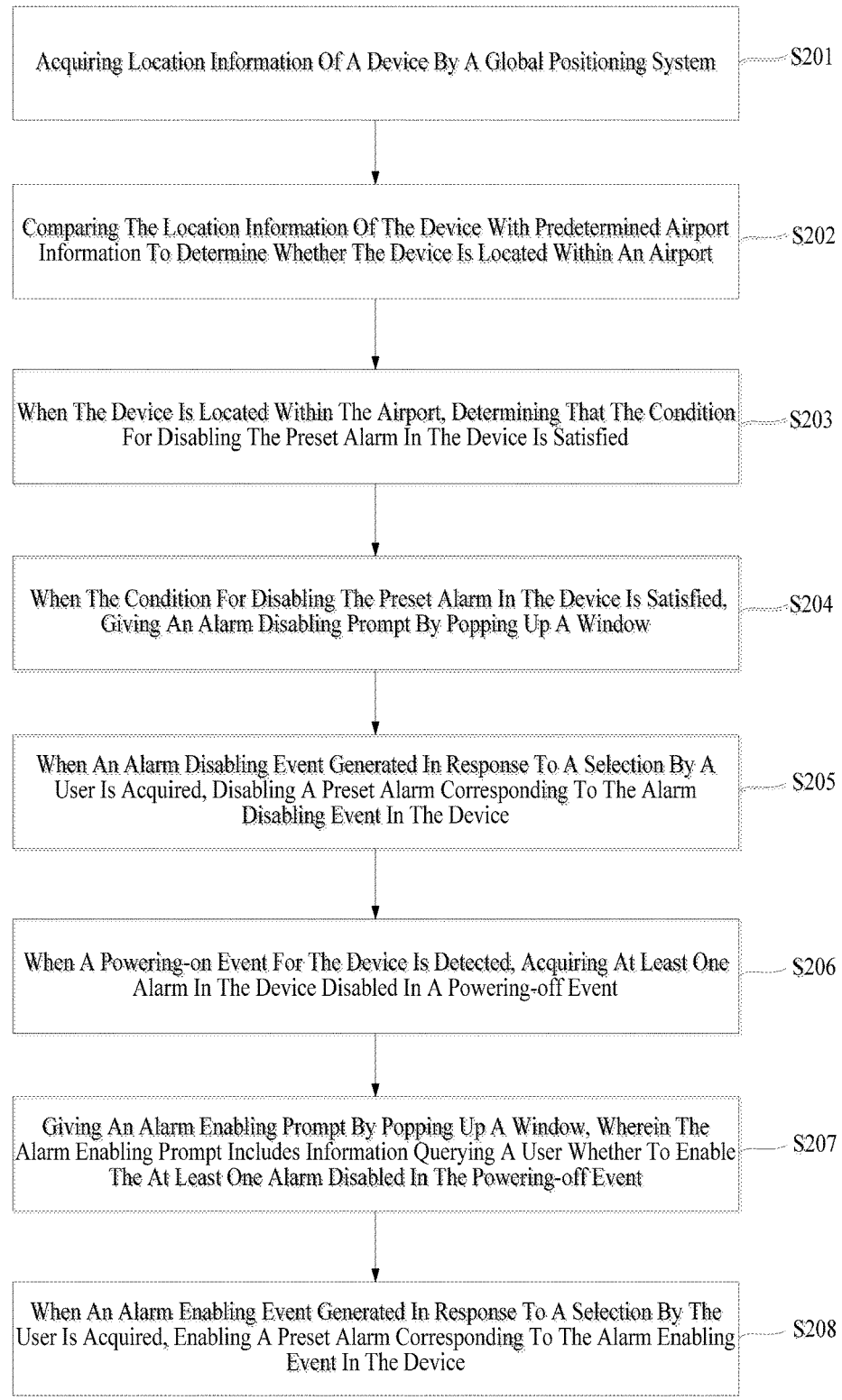
FIG. 2 is a flowchart of a method for disabling an alarm in a device according to another exemplary embodiment.

FIG. 2 is a flowchart of a method for disabling an alarm in a device according to another exemplary embodiment. As shown in FIG. 2, there are many ways to determine whether a condition for disabling a preset alarm in a device is satisfied. In an example, the following steps may be included.

In step S201, location information of the device is acquired by a Global Positioning System (GPS).

In step S202, the location information of the device is compared with predetermined airport information to determine whether the device is located within an airport.

In step S203, when the device is located within an airport, it is determined that the condition for disabling the preset alarm in the device is satisfied.

Typically, a device may be considered as located within an airport if the device is at the airport or at a location within a certain range (for example, 100, 200 or 500 meters) from the airport.

In a specific application scenario, for example, a user arrives at an airport A and presses down a powering-off button (for example, a "power button") of a device (for example, a mobile phone) before his/her plane takes off. If the mobile phone detects the powering-off event, location information of the mobile phone is acquired by GPS (as "Airport A", for example). Then, the location information of the mobile phone, "Airport A", is compared with predetermined airport information, to determine whether "Airport A" matches the predetermined airport information. The airport information such as airport name, address and size may be pre-stored in a predetermined keyword database. The location information of the mobile phone is compared with the predetermined keyword database. If there is a match, it may be determined that the mobile phone is located within the airport. Accordingly, it may be determined that the condition for disabling a preset alarm in the mobile phone is satisfied. Then, an instruction of disabling a power-off alarm may be sent to a clock application of the mobile phone.

In a possible implementation, the step 102, at which the preset alarm in the device is disabled when the condition for disabling the preset alarm in the device is satisfied, comprises the following steps.

In step S204, when the condition for disabling the preset alarm in the device is satisfied, an alarm disabling prompt is given by popping up a window. The alarm disabling prompt includes information querying a user whether to disable at least one preset alarm.

In step S205, when an alarm disabling event generated in response to a selection by the user is acquired, a preset alarm which corresponds to the alarm disabling event is disabled in the device.

It is to be noted that, when a user powers on a device after completing the flight, an alarm prompt may pop up by popping up a window to prompt the user of an expired alarm event and ask the user whether to enable an alarm disabled in a previous powering-off event. The previous powering-off event may be the latest powering-off event before the present powering-on event.

In a possible implementation, the method may further comprise the following steps.

In step S206, when a powering-on event for the device is detected, at least one alarm in the device disabled in the powering-off event is acquired.

In step S207, an alarm enabling prompt is given by popping up a window. The alarm enabling prompt includes information querying a user whether to enable the at least one alarm disabled in the powering-off event.

In step S208, when an alarm enabling event generated in response to a selection by the user is acquired, a preset alarm which corresponds to the alarm enabling event is enabled in the device.

In an example, after a powering-off event for the device is triggered, the user may be prompted to disable a power-off alarm by popping up a clock window, if it is detected that the device is within an airport and if an alarm which will ring in a few hours is set in the device. In addition, when the user powers on the device again, the user may be prompted of an expired alarm event and advised to enable the power-off alarm again by popping up a window. The popped-up window prompt is illustrative other than limiting. In practical application scenario, other prompts such as sound prompt, image prompt and video prompt may be adopted additionally or alternatively. While giving a prompt, a button may be additionally provided for the user to select whether to disable or enable the alarm, thereby making it easier for the user to select whether to disable or enable certain one or more alarms.

With the method for disabling the alarm in the device according to the embodiment, when the device is powered off, it can be determined timely whether the user has been on aboard or is about to board, based on location information of the device. When it is determined that the user has been on aboard or is about to board, the user may be timely prompted to disable a preset alarm in the device, thereby preventing a power-off alarm in the device from working within the airport and thus reducing security risks.

Figure 3:
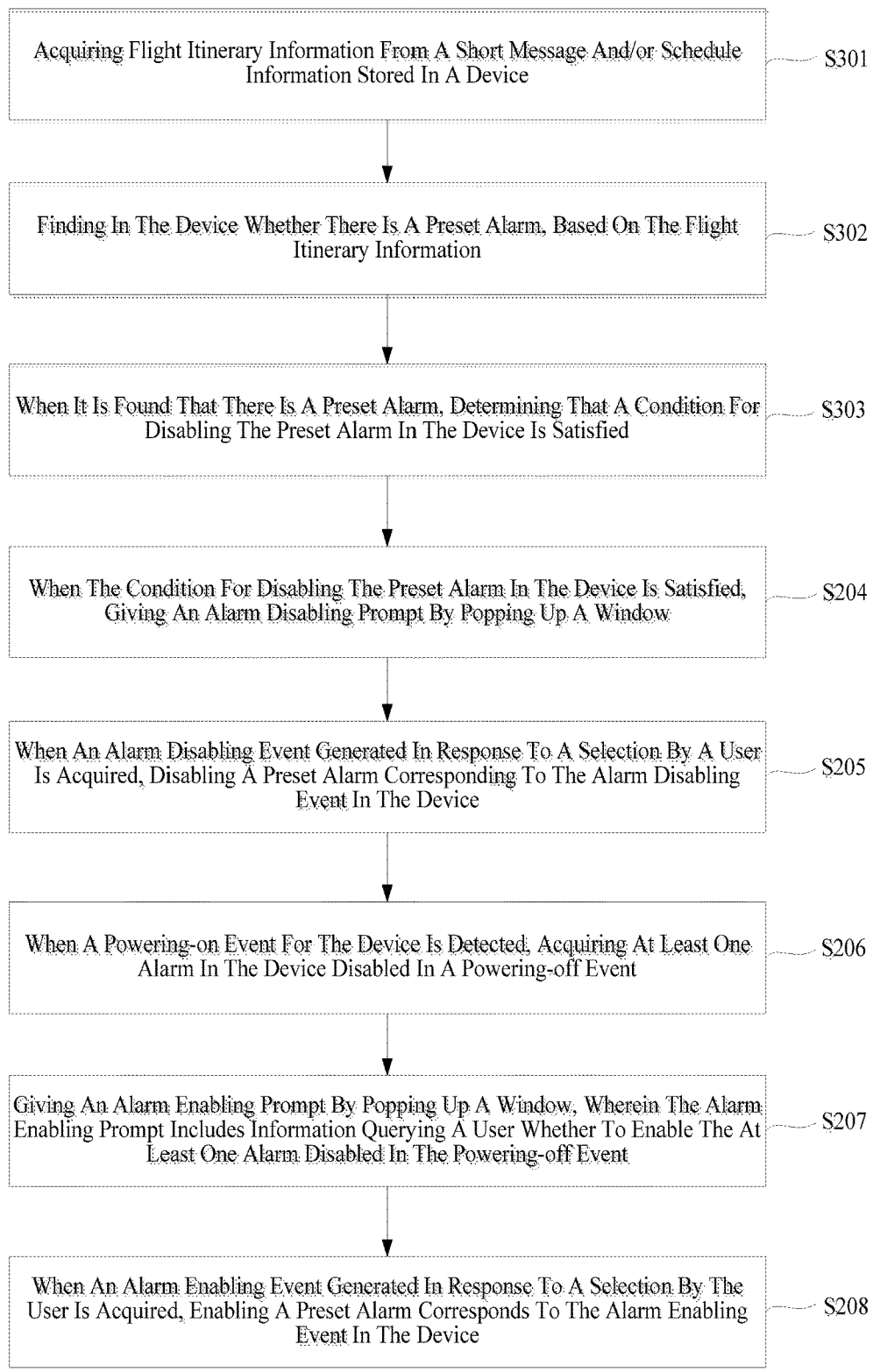
FIG. 3 is a flowchart of a method for disabling an alarm in a device according to yet another exemplary embodiment.

FIG. 3 is a flowchart of a method for disabling an alarm in a device according to yet another exemplary embodiment. The same steps in FIG. 3 as those in FIG. 2 have the same meanings and will not be described here redundantly.

As shown in FIG. 3, the present embodiment differs from the above embodiment mainly in that determining whether the condition for disabling the preset alarm in the device is satisfied may comprise the following steps.

In step S301, flight itinerary information is acquired from a short message and/or schedule information stored in the device.

In step S302, it is found in the device whether there is a preset alarm, based on the flight itinerary information.

In step S303, when it is found that there is a preset alarm, it is determined that the condition for disabling the preset alarm in the device is satisfied.

For example, after a user presses down a "power button" to trigger a powering-off event, the device may traverse all flight-related information in short messages which contains keywords, such as "current date and flight", "current date and airport terminal" and "current date and ticket". If there is a match, the flight itinerary information may be acquired from the short messages. As another example, after the user presses down the "power button" to trigger a powering-off event, the device may traverse all schedule information in the calendar and detect whether there is flight itinerary information containing keywords such as "flight", "aero-" and "airport" on the current date. If flight itinerary information exists, the flight itinerary information may be acquired from the schedule information. Of course, the flight itinerary information may also be acquired from both the short messages and the schedule information. In this embodiment, after a powering-off event for the device is triggered, the user may be prompted to disable a power-off alarm by popping up a clock window, if it is detected that the device contains therein flight itinerary information and if an alarm which will ring in a few hours is set in the device. In addition, when the user powers on the device again, the user may be prompted of an expired alarm event and advised to enable the power-off alarm again by popping up a window.

In a possible implementation, the step S302 may comprise finding in the device whether there is a preset alarm within a time range of the flight itinerary information. The step S303 may comprise disabling the preset alarm within the time range of the flight itinerary information in the device.

For example, when there are multiple alarms in the device, some of them may not affect the flight. For example, some preset alarms will not work before the user completes the flight. Based on certain flight itinerary information, a time range of the flight can be determined. For example, if the flight-related travel information is "Beijing to Hong Kong, Flight No. CA111 333, 09:30 to 13:05, Economy Class", then the time range when the flight is likely to be affected by signals from a powered-on mobile phone is 09:30 to 13:05. If there are three preset alarms in the device which are respectively set to work at 9:45, 12:40 and 18:30, then the device being powered on due to working of the alarms at 9:45 and 12:40 which fall within the time range of 09:30 to 13:05 will perhaps affect the flight. While the alarm at 18:30 will not affect the flight. Therefore, the alarm at 18:30 does not need to be disabled, and only the alarms at 9:45 and 12:40 need to be disabled.

With the method for disabling the alarm in the device according to the embodiment, when the device is powered off, it can be determined from a short message and/or schedule information whether a user will take a plane. When it is determined that the user will take a plane, the user can be timely prompted to disable a preset alarm in the device, thereby preventing a power-off alarm in the device from working within the airport and thus reducing security risks.

Figure 4:
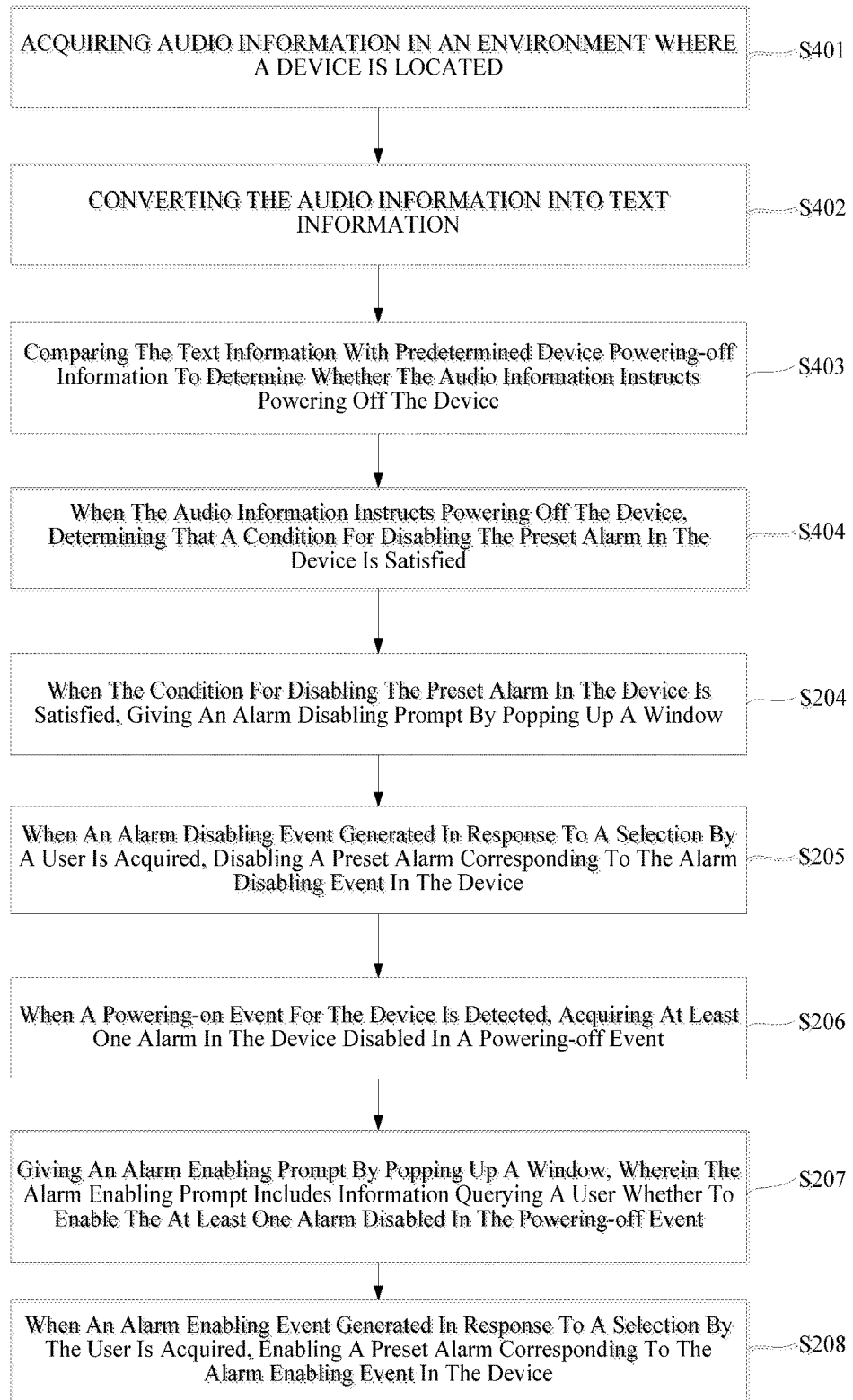
FIG. 4 is a flowchart of a method for disabling an alarm in a device according to still another exemplary embodiment.

FIG. 4 is a flowchart of a method for disabling an alarm in a device according to still another exemplary embodiment. The same steps in FIG. 4 as those in FIGS. 2 and 3 have the same meanings and will not be described here redundantly.

As shown in FIG. 4, the present embodiment differs from the above embodiment mainly in that determining whether the condition for disabling the preset alarm in the device is satisfied may comprise the following steps.

In step S401, audio information in an environment where the device is located is acquired.

In step S402, the audio information is converted into text information.

In step S403, the text information is compared with predetermined device powering-off information to determine whether the audio information instructs powering off the device.

In step S404, when the audio information instructs powering off the device, it is determined that the condition for disabling the preset alarm in the device is satisfied.

In a specific application scenario, after a user presses down "a power button" to trigger a powering-off event, the device may invoke a voice inputting process of a voice assistant. Then, the voice inputting process may collect audio information in the environment, such as "please powering off the mobile phone" and "please powering off all electronic devices". Next, the collected audio information may be converted into text information, which is in turn compared with a preset keyword database. The preset keyword database may pre-store therein some device powering-off information of a text format, such as "please powering off the mobile phone", "please powering off the computer" and "please powering off all electronic devices". If the parsed out text information hits predetermined device powering-off information in the predetermined keyword database, then it is determined that the audio information instructs powering off the device. Accordingly, it is determined that the condition for disabling a preset alarm in the mobile phone is satisfied.

In the embodiment, after a powering-off event for the device is triggered, the user may be prompted to disable a power-off alarm by popping up a clock window, if it is detected that there is audio information instructing powering off the device and if an alarm which will ring in a few hours is set in the device. In addition, when the user powers on the device again, the user may be prompted of an expired alarm event and advised to enable the power-off alarm again by popping up a window.

With the method for disabling the alarm in the device according to the embodiment, when the device is powered off, it can be determined timely, based on voice information in the environment, whether a relevant person (such as a flight attendant) around the user vocally prompts the user to power off the device. When it is determined that a flight attendant around the user vocally prompts the user to power off the device, the user may be timely prompted to disable a preset alarm in the device, thereby preventing a power-off alarm in the device from working within the airport and thus reducing security risks.

Figure 5:
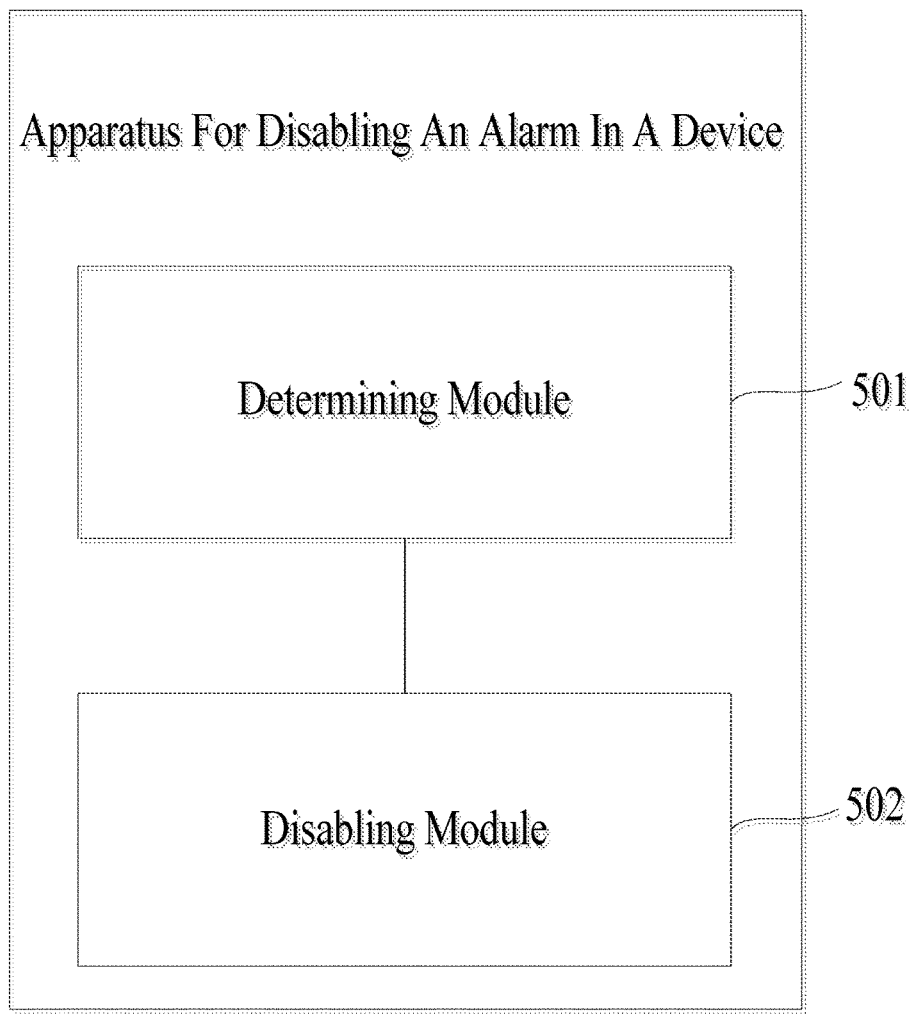
FIG. 5 is a block diagram of an apparatus for disabling an alarm in a device according to an exemplary embodiment.

FIG. 5 is a block diagram of an apparatus for disabling an alarm in a device according to an exemplary embodiment. Referring to FIG. 5, the apparatus 500 comprises a determining module 501 and a disabling module 502.

The determining module 501 is configured to, when a powering-off event for the device is detected, determine whether a condition for disabling a preset alarm in the device is satisfied. The disabling module 502 is configured to, when the condition for disabling the preset alarm in the device is satisfied, disable the preset alarm in the device to prevent the preset alarm from being activated when the device is in a powered-off state.

With the embodiment, when a powering-off event for a device is detected, it can be determined whether a condition for disabling a preset alarm in the device is satisfied, thereby disabling the preset alarm in the device timely as required. As such, a power-off alarm in the device can be blocked from working, thereby reducing impacts on surrounding environments of the device caused by working of the power-off alarm. For example, when a user is on aboard or near a plane, a power-off alarm is timely blocked from working, thereby reducing security risks.

Figure 6:
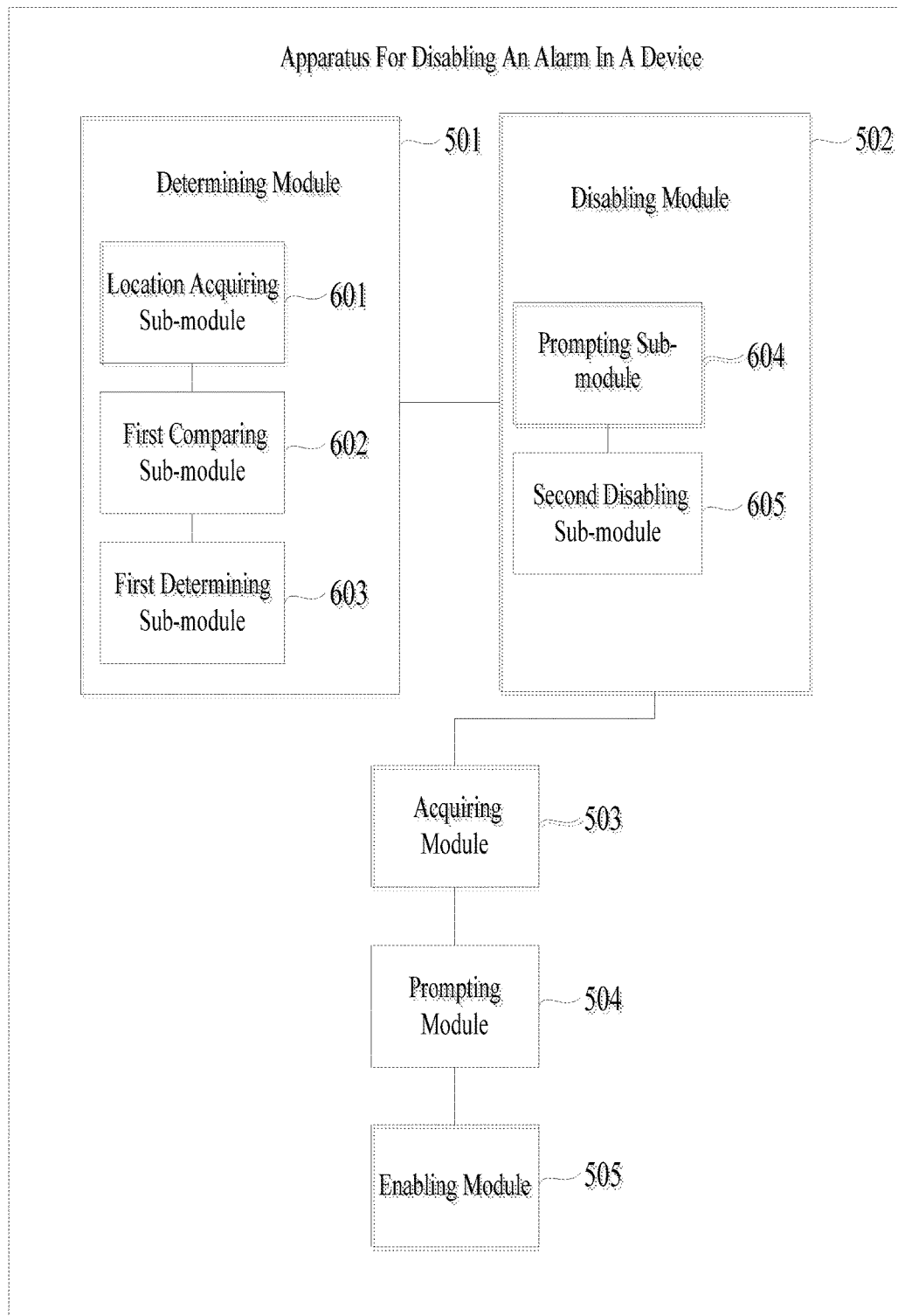
FIG. 6 is a block diagram of an apparatus for disabling an alarm in a device according to another exemplary embodiment.

FIG. 6 is a block diagram of an apparatus 500 for disabling an alarm in a device according to another exemplary embodiment. The same components in FIG. 6 as those in FIG. 5 have the same meanings and will not be described here redundantly.

Referring to FIG. 6, the determining module 501 in the apparatus may comprises: a location acquiring sub-module 601, a first comparing sub-module 602 and a first determining sub-module 603. The location acquiring sub-module 601 is configured to acquire location information of the device by a GPS. The first comparing sub-module 602 is configured to compare the location information of the device with predetermined airport information to determine whether the device is located within an airport. The first determining sub-module 603 is configured to, when the device is located within an airport, determine that the condition for disabling the preset alarm in the device is satisfied.

In a possible implementation, the disabling module 502 may further comprise: a prompting sub-module 604 and a second disabling sub-module 605. The prompting sub-module 604 is configured to, when the condition for disabling the preset alarm in the device is satisfied, give an alarm disabling prompt by popping up a window, wherein the alarm disabling prompt includes information querying a user whether to disable at least one preset alarm. The second disabling sub-module 605 is configured to, when an alarm disabling event generated in response to a selection by the user is acquired, disable a preset alarm in the device which corresponds to the alarm disabling event.

In a possible implementation, the apparatus 500 may further comprise: an acquiring module 503, a prompting module 504 and an enabling module 505. The acquiring module 503 is configured to, when a powering-on event for the device is detected, acquire at least one alarm in the device disabled in the powering-off event. The prompting module 504 is configured to give an alarm enabling prompt by popping up a window, wherein the alarm enabling prompt includes information querying a user whether to enable the at least one alarm disabled in the case of the powering-off event. The enabling module 505 is configured to, when an alarm enabling event generated in response to a selection by the user is acquired, enable a preset alarm in the device which corresponds to the alarm enabling event.

With the apparatus for disabling the alarm in the device according to the embodiment, when the device is powered off, it can be determined timely whether the user has been on aboard or is about to board, based on location information of the device. When it is determined that the user has been on aboard or is about to board, the user may be timely prompted to disable a preset alarm in the device, thereby preventing a power-off alarm in the device from working within the airport and thus reducing security risks.

Figure 7:
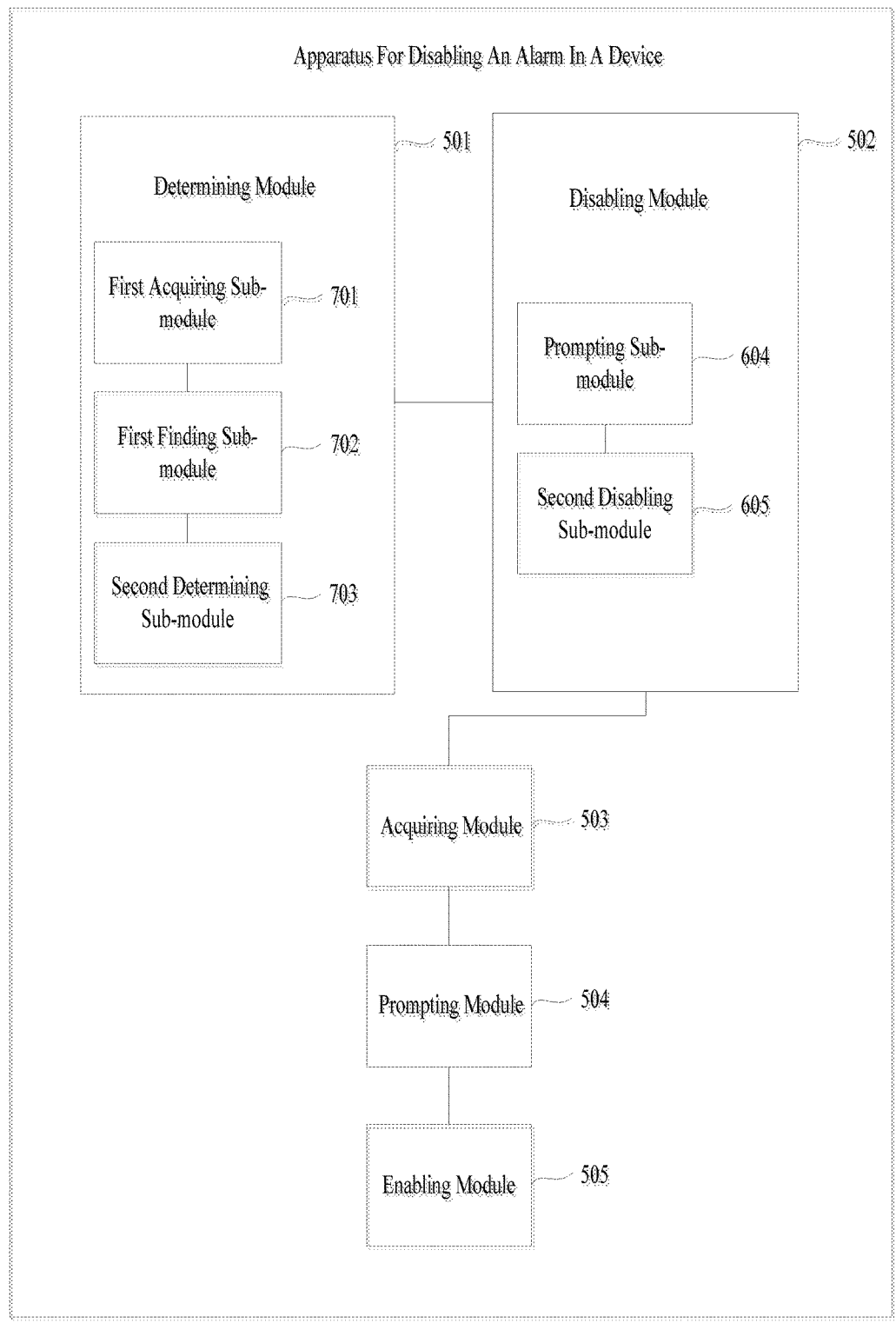
FIG. 7 is a block diagram of an apparatus for disabling an alarm in a device according to yet another exemplary embodiment.

FIG. 7 is a block diagram of an apparatus 500 for disabling an alarm in a device according to yet another exemplary embodiment. The same components in FIG. 7 as those in FIGS. 5 and 6 have the same meanings and will not be described here redundantly.

Referring to FIG. 7, the determining module 501 in the apparatus 500 may further comprise: a first acquiring sub-module 701, a first finding sub-module 702 and a second determining sub-module 703. The first acquiring sub-module 701 is configured to acquire flight itinerary information from a short message and/or schedule information stored in the device. The first finding sub-module 702 is configured to find in the device whether there is a preset alarm, based on the flight itinerary information. The second determining sub-module 703 is configured to, when it is found that there is a preset alarm, determine that the condition for disabling the preset alarm in the device is satisfied.

In a possible implementation, the disabling module 501 may comprise: a second finding sub-module and a first disabling sub-module. The second finding sub-module is configured to find in the device whether there is a preset alarm within a time range of the flight itinerary information. The first disabling sub-module is configured to disable the preset alarm within the time range of the flight itinerary information in the device.

With the apparatus for disabling the alarm in the device according to the embodiment, when a device is powered off, it can be determined from a short message and/or schedule information whether a user will take a plane. When it is determined that the user will take a phone, the user can be timely prompted to disable a preset alarm in the device, thereby preventing a power-off alarm in the device from working within the airport and thus reducing security risks.

Figure 8:
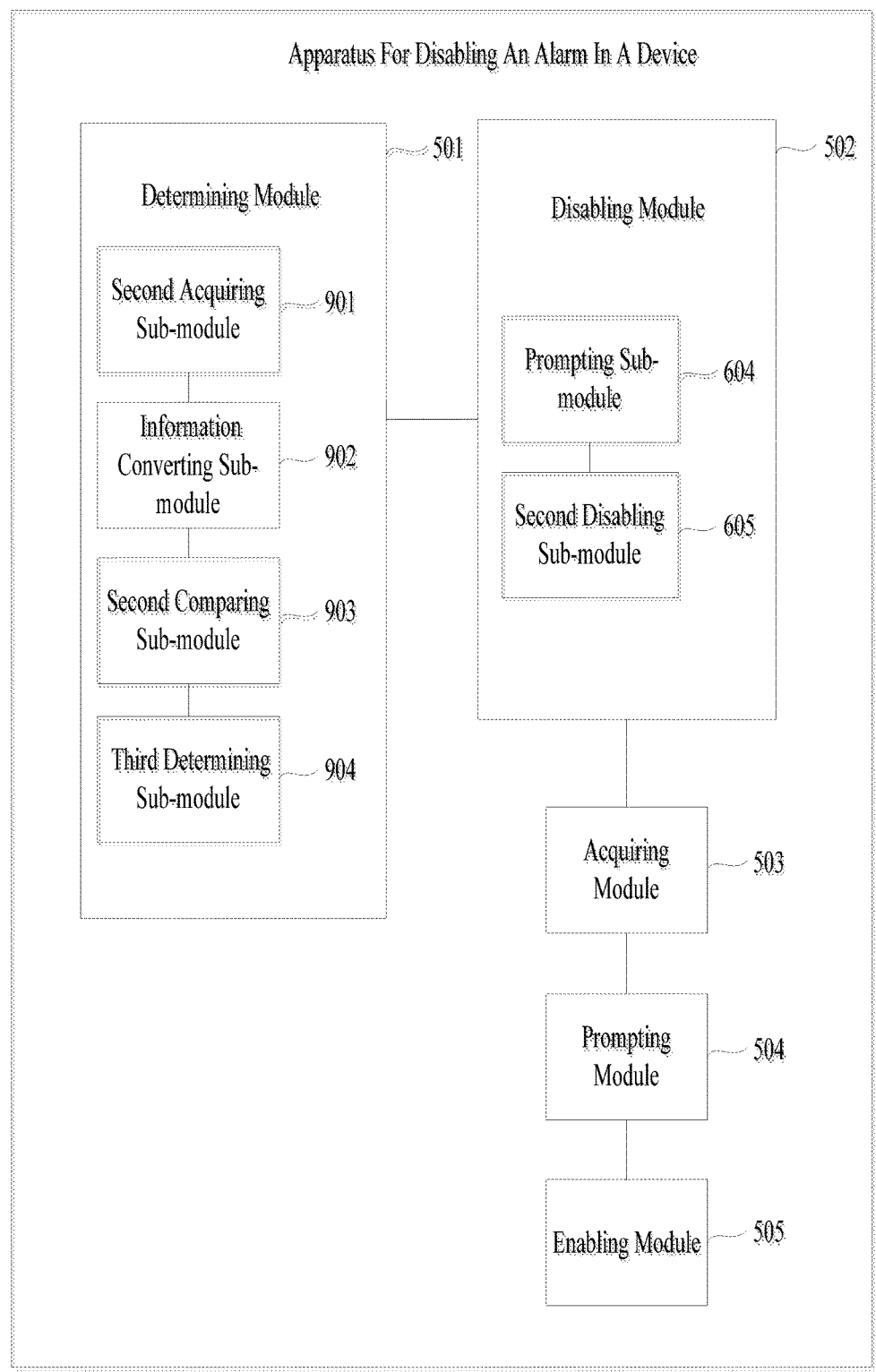
FIG. 8 is a block diagram of an apparatus for disabling an alarm in a device according to still another exemplary embodiment.

FIG. 8 is a block diagram of an apparatus 500 for disabling an alarm in a device according to still another exemplary embodiment. The same components in FIG. 8 as those in FIGS. 5-7 have the same meanings and will not be described here redundantly.

Referring to FIG. 8, the determining module 501 in the apparatus may comprise: a second acquiring sub-module 901, an information converting sub-module 902, a second comparing sub-module 903 and a third determining sub-module 904. The second acquiring sub-module 901 is configured to acquire audio information in an environment where the device is located. The information converting sub-module 902 is configured to convert the audio information into text information. The second comparing sub-module 903 is configured to compare the text information with predetermined device powering-off information, to determine whether the audio information instructs powering off the device. The third determining sub-module 904 is configured to, when the audio information instructs powering off the device, determine that the condition for disabling the preset alarm in the device is satisfied.

With the apparatus for disabling the alarm in the device according to the embodiment, when the device is powered off, it can be determined timely, based on voice information in the environment, whether a relevant person (such as a flight attendant) around the user vocally prompts the user to power off the device. When it is determined that a flight attendant person around the user vocally prompts the user to power off the device, the user may be timely prompted to disable a preset alarm in the device, thereby preventing a power-off alarm in the device from working within the airport and thus reducing security risks.

Regarding the apparatus in the above embodiments, the specific manners for the individual modules to perform operations have been described in detail in the embodiments of the related methods and will not be elaborated herein.

Figure 9:
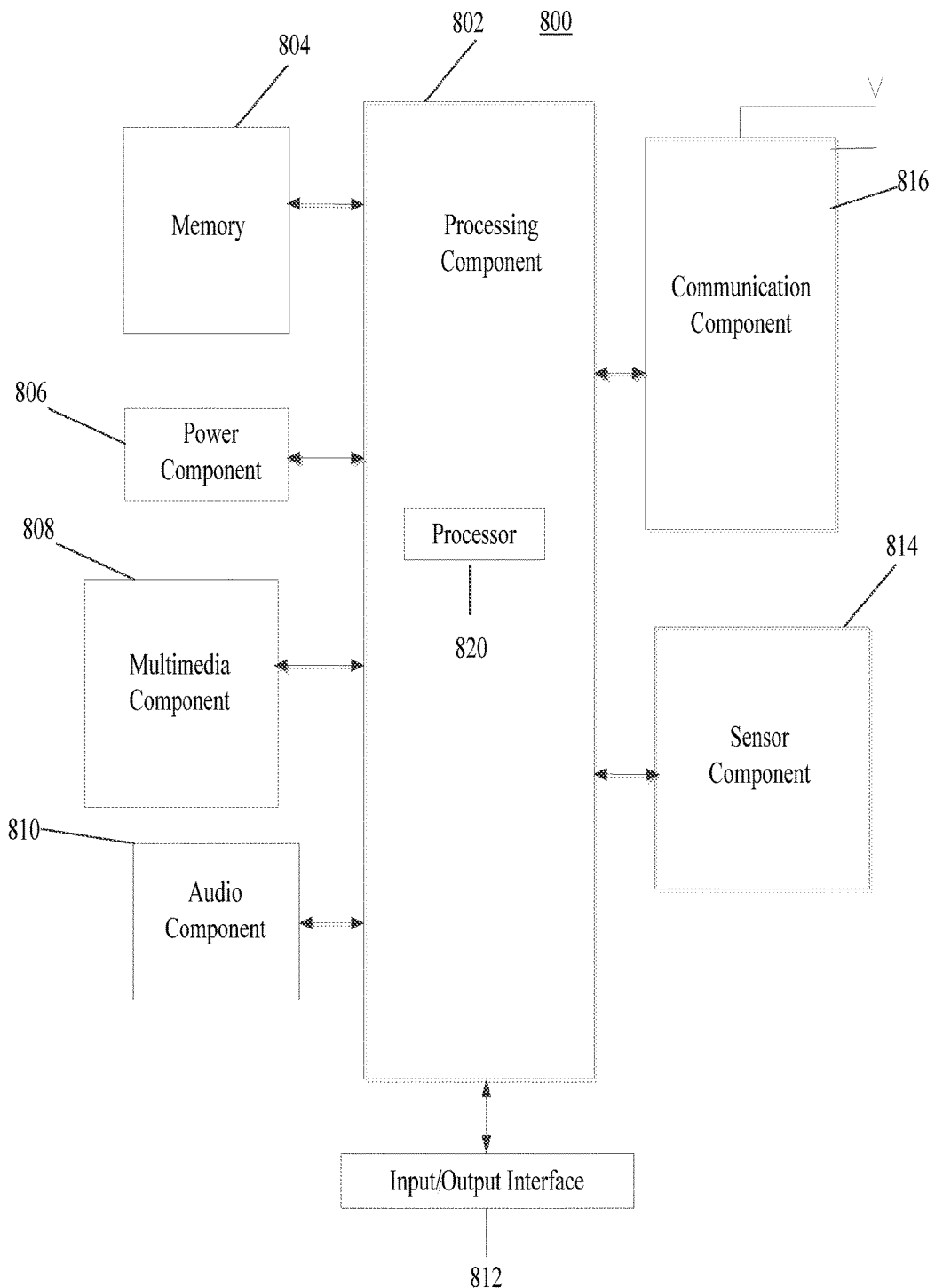
FIG. 9 is a block diagram of an apparatus for disabling an alarm in a device according to a further exemplary embodiment.

FIG. 9 is a block diagram of an apparatus 800 for disabling an alarm in a device according to a further exemplary embodiment. For example, the apparatus 800 may be a mobile phone, a computer, a digital broadcast terminal, a messaging device, a gaming console, a tablet device, a medical device, exercise equipment, a personal digital assistant or the like.

Referring to FIG. 9, the apparatus 800 may comprise one or more of the following components: a processing component 802, a memory 804, a power component 806, a multimedia component 808, an audio component 810, an input/output (I/O) interface 812, a sensor component 814 and a communication component 816.

The processing component 802 typically controls overall operations of the apparatus 800, such as the operations associated with display, telephone calls, data communications, camera operations and recording operations. The processing component 802 may include one or more processors 820 to execute instructions to perform all or some of the steps in the above described methods. Moreover, the processing component 802 may include one or more modules which facilitate the interaction between the processing component 802 and other components. For example, the processing component 802 may comprise a multimedia module to facilitate the interaction between the multimedia component 808 and the processing component 802.

The memory 804 is configured to store various types of data to support the operation of the apparatus 800. Examples of such data comprise instructions for any applications or methods operated on the apparatus 800, contact data, phonebook data, messages, pictures, video, etc. The memory 804 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may comprise a power management system, one or more power sources, and any other components associated with the generation, management, and distribution of power in the apparatus 800.

The multimedia component 808 comprises a screen providing an output interface between the apparatus 800 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 comprises one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, presence or absence of user's contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In one embodiment, the communication component 816 receives a broadcast signal or broadcast associated information from an external broadcast management system via a broadcast channel. In one embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an embodiment, there is also provided a non-transitory computer-readable storage medium comprising instructions, such as comprised in the memory 804, executable by the processor 820 in the apparatus 800, for performing the above-described methods. For example, the non-transitory computer-readable storage medium may be a ROM, a RAM, a CD-ROM, a magnetic tape, a floppy disc, an optical data storage device or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for disabling an alarm in a device, the method comprising:
   determining whether a condition for disabling a preset alarm in the device is satisfied when a powering-off event for the device is detected; and
   disabling the preset alarm in the device to prevent the preset alarm from being activated when the device is in a powered-off state when the condition for disabling the preset alarm in the device is satisfied,
   wherein determining whether the condition for disabling the preset alarm in the device is satisfied comprises:
   acquiring flight itinerary information from a short message and/or schedule information stored in the device;
   finding in the device whether there is a preset alarm within a time range of the flight itinerary information; and
   determining that the condition for disabling the preset alarm in the device is satisfied when it is found that the preset alarm is within the time range of the flight itinerary information.

2. The method of claim 1, wherein determining whether the condition for disabling the preset alarm in the device is satisfied comprises:
   acquiring location information of the device by a Global Positioning System (GPS);
   comparing the location information of the device with predetermined airport information to determine whether the device is located within an airport; and
   determining that the condition for disabling the preset alarm in the device is satisfied when it is determined that the device is located within the airport.

3. The method of claim 1, wherein determining whether the condition for disabling the preset alarm in the device is satisfied comprises:
   acquiring audio information in an environment where the device is located;
   converting the audio information into text information;
   comparing the text information with predetermined device powering-off information to determine whether the audio information instructs powering off the device; and
   determining that the condition for disabling the preset alarm in the device is satisfied when the audio information instructs powering off the device.

4. The method of claim 1, wherein disabling the preset alarm in the device when the condition for disabling the preset alarm in the device is satisfied comprises:
   giving an alarm disabling prompt by popping up a window when the condition for disabling the preset alarm in the device is satisfied, wherein the alarm disabling prompt includes information querying a user whether to disable at least one preset alarm; and
   disabling a preset alarm corresponding to an alarm disabling event in the device when the alarm disabling event generated in response to a selection by the user is acquired.

5. The method of claim 1, further comprising:
   acquiring at least one alarm in the device disabled in the powering-off event when a powering-on event for the device is detected;
   giving an alarm enabling prompt by popping up a window, wherein the alarm enabling prompt includes information querying a user whether to enable the at least one alarm disabled in the powering-off event; and
   enabling a preset alarm corresponding to an alarm enabling event in the device when the alarm enabling event generated in response to a selection by the user is acquired.

6. An apparatus for disabling an alarm in a device, the apparatus comprising:
   a processor; and
   a memory storing instructions executable by the processor,
   wherein the processor is configured to:
   determine whether a condition for disabling a preset alarm in the device is satisfied when a powering-off event for the device is detected; and
   disable the preset alarm in the device to prevent the preset alarm from being activated when the device is in a powered-off state when the condition for disabling the preset alarm in the device is satisfied,
   wherein the processor configured to determine whether the condition for disabling the preset alarm in the device is satisfied is further configured to:
   acquire flight itinerary information from a short message and/or schedule information stored in the device;
   find in the device whether there is a preset alarm within a time range of the flight itinerary information; and
   determine that the condition for disabling the preset alarm in the device is satisfied when it is found that the preset alarm is within the time range of the flight itinerary information.

7. The apparatus of claim 6, wherein the processor configured to determine whether the condition for disabling the preset alarm in the device is satisfied is further configured to:
   acquire location information of the device by a GPS;
   compare the location information of the device with predetermined airport information to determine whether the device is located within an airport; and
   determine that the condition for disabling the preset alarm in the device is satisfied when it is determined that the device is located within the airport.

8. The apparatus of claim 6, wherein the processor configured to determine whether the condition for disabling the preset alarm in the device is satisfied is further configured to:
   acquire audio information in an environment where the device is located;
   convert the audio information into text information;
   compare the text information with predetermined device powering-off information to determine whether the audio information instructs powering off the device; and
   determine that the condition for disabling the preset alarm in the device is satisfied when the audio information instructs powering off the device.

9. The apparatus of claim 6, wherein the processor configured to disable the preset alarm in the device when the condition for disabling the preset alarm in the device is satisfied is further configured to:
   give an alarm disabling prompt by popping up a window when the condition for disabling the preset alarm in the device is satisfied, wherein the alarm disabling prompt includes information querying a user whether to disable at least one preset alarm; and
   disable a preset alarm corresponding to an alarm disabling event in the device when the alarm disabling event generated in response to a selection by the user is acquired.

10. The apparatus of claim 6, wherein the processor is further configured to:

acquire at least one alarm in the device disabled in the powering-off event when a powering-on event for the device is detected;

give an alarm enabling prompt by popping up a window, wherein the alarm enabling prompt includes information querying a user whether to enable the at least one alarm disabled in the powering-off event; and enable a preset alarm corresponding to an alarm enabling event in the device when the alarm enabling event generated in response to a selection by the user is acquired.

11. A non-transitory computer-readable storage medium having stored therein instructions that, when executed by a processor of a mobile terminal, causes the mobile terminal to perform a method for disabling an alarm in a device, the method comprising:

determining whether a condition for disabling a preset alarm in the device is satisfied when a powering-off event for the device is detected;

disabling the preset alarm in the device to prevent the preset alarm from being activated when the device is in a powered-off state when the condition for disabling the preset alarm in the device is satisfied, wherein determining whether the condition for disabling the preset alarm in the device is satisfied comprises:

acquiring flight itinerary information from a short message and/or schedule information stored in the device;

finding in the device whether there is a preset alarm within a time range of the flight itinerary information; and determining that the condition for disabling the preset alarm in the device is satisfied when it is found that the preset alarm is within the time range of the flight itinerary information.

12. The storage medium of claim 11, wherein determining whether the condition for disabling the preset alarm in the device is satisfied comprises:

acquiring location information of the device by a GPS;

comparing the location information of the device with predetermined airport information to determine whether the device is located within an airport; and determining that the condition for disabling the preset alarm in the device is satisfied when it is determined that the device is located within the airport.

13. The storage medium of claim 11, wherein determining whether the condition for disabling the preset alarm in the device is satisfied comprises:

acquiring audio information in an environment where the device is located;

converting the audio information into text information;

comparing the text information with predetermined device powering-off information to determine whether the audio information instructs powering off the device; and determining that the condition for disabling the preset alarm in the device is satisfied when the audio information instructs powering off the device.

14. The storage medium of claim 11, wherein disabling the preset alarm in the device when the condition for disabling the preset alarm in the device is satisfied comprises:

giving an alarm disabling prompt by popping up a window when the condition for disabling the preset alarm in the device is satisfied, wherein the alarm disabling prompt includes information querying a user whether to disable at least one preset alarm; and disabling a preset alarm corresponding to an alarm disabling event in the device when the alarm disabling event generated in response to a selection by the user is acquired.

* * * * *